United States Patent
Chen

(10) Patent No.: US 7,897,134 B1
(45) Date of Patent: Mar. 1, 2011

(54) SYSTEM AND METHOD FOR CALCINING GYPSUM

(75) Inventor: Michael M. Chen, Naperville, IL (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 12/537,617

(22) Filed: Aug. 7, 2009

(51) Int. Cl.
*B01J 19/00* (2006.01)
*C01F 11/46* (2006.01)
*C04B 11/02* (2006.01)

(52) U.S. Cl. .................. 423/555; 106/772; 422/129; 422/187; 422/232; 422/234

(58) Field of Classification Search ............. 423/555; 422/129, 187, 232, 234; 106/772
See application file for complete search history.

(56) References Cited

U.S. PATENT DOCUMENTS 3,956,456 A * 5/1976 Keller et al. ............ 423/171
4,569,831 A * 2/1986 Cohen ..................... 423/171
5,437,850 A * 8/1995 Kroehl et al. ........... 423/171

OTHER PUBLICATIONS

Article: "New Literature on Raymond IMP Mills", by ALSTOM Power Inc., Mar. 19, 2004.
Kreft W: "Thermal treatment of mineral raw materials by the cross-flow process - Process engineering and product application", vol. 41, n0. 9 Sep. 1, 1988.
PCT International Search Report and The Written Opinion of the International Searching Authority dated Oct. 12, 2010 (PCT/US2010/039564).

* cited by examiner

*Primary Examiner*—Timothy C Vanoy
(74) *Attorney, Agent, or Firm*—Lawrence P. Zale

(57) ABSTRACT

A system (100) for calcining natural gypsum, synthetic gypsum (112) or a combination thereof, the system including: a mill (114) for grinding and drying natural gypsum, synthetic gypsum (112) or a combination thereof, to produce dried gypsum (116); a flash calciner (118) for calcining the dried gypsum to produce an exhaust gas (130) and calcined gypsum (128); and a mechanism (134) for transporting at least a portion of the exhaust gas (130) produced by the flash calciner (118) to an air heater (126) that supplies hot gas (126*a*) to the flash calciner (118).

15 Claims, 3 Drawing Sheets

SYSTEM AND METHOD FOR CALCINING GYPSUM

BACKGROUND OF THE INVENTION

1. Field of the Invention

The disclosed subject matter relates to a system and method for calcining gypsum. More specifically, the disclosed subject matter relates to a system and method for calcining natural gypsum, synthetic gypsum, or a combination thereof.

2. Description of Related Art

Gypsum can be either natural gypsum that is mines or synthetically produced gypsum. Natural gypsum is hard and resembles rocks. It must be crushed before use. Synthetic gypsum is typically created from powdered limestone that combines with $SO_2$ and $SO_3$ gasses in the scrubbers of power plants.

Calcined gypsum (also known as stucco) has a wide variety of uses. Calcined gypsum is most commonly known for its use in drywall (also known as wallboard or gypsum board), manufactured commercially by processes that provide an aqueous slurry of calcined gypsum and other ingredients to be deposited between two sheets of cover paper to form a core between those sheets.

Calcination (or "calcining") refers to the conversion of calcium sulfate dehydrate to calcium sulfate hemihydrates. The process is typically conducted by exposing gypsum to high temperatures for a short period of time in a calciner.

Roller mills can be used for grinding but cannot be used for calcining. They can be used for drying material. These are preferred to be used for natural gypsum. Roller mill is often used for grinding natural gypsum and a kettle for calcining natural gypsum.

There are also impact mills. These can be used for both grinding and for calcining. However, using impact mills for natural gypsum require significantly more energy to run than roller mills. Therefore, the resulting product from processing natural gypsum using impact mills becomes more costly.

However, for synthetic gypsum, there is not much of a difference in energy required to operate roller mills versus impact mills. This is due to the fact that synthetic gypsum is typically in granular form and does not require a great deal of milling.

Since synthetic gypsum has higher water content than natural gypsum, a cage mill is often used for drying first. An impact mill is then used for grinding and calcining in a single step. Prior efforts for calcining synthetic gypsum in a single step have resulted in lack of calcining uniformity, which reduces the quality of the calcined gypsum.

Another drawback is that current technology does not provide the flexibility to process only natural gypsum, only synthetic gypsum or a combination thereof.

SUMMARY OF THE INVENTION

According to aspects illustrated herein, there is provided a system for calcining natural gypsum, synthetic gypsum or a combination thereof, the system comprising: a mill for grinding and drying natural gypsum, synthetic gypsum or a combination thereof, to produce dried gypsum; a flash calciner for calcining the dried gypsum to produce an exhaust gas and calcined gypsum; and a mechanism for transporting at least a portion of the exhaust gas produced by the flash calciner to an air heater that supplies hot gas to the flash calciner.

According to another aspect illustrated herein, there is provided a process for calcining natural gypsum, synthetic gypsum or a combination thereof, the process comprising: supplying natural gypsum, synthetic gypsum or a combination thereof to a mill; grinding and drying the natural gypsum, synthetic gypsum or a combination thereof in the mill to form dried gypsum and a first exhaust gas; supplying the dried gypsum to a flash calciner; calcining the dried gypsum in the flash calciner, thereby producing a second exhaust gas and calcined gypsum; and transporting at least a portion of the second exhaust gas to an air heater that provides hot gas to the flash calciner.

According to another aspect illustrated herein, there is provided a system for calcining gypsum, the system comprising: a mill for grinding and drying gypsum, thereby producing dried gypsum and a first exhaust gas, wherein the mill is selected from a roller mill or a hammer impact mill, and further wherein the gypsum is selected from natural gypsum, synthetic gypsum or a combination thereof; a flash calciner for calcining the dried gypsum, thereby producing calcined gypsum and a second exhaust gas; and a mechanism for transporting the second exhaust gas produced by the flash calciner to a first air heater coupled to the flash calciner.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF PREFERRED EMBODIMENTS

Synthetic gypsum, also known as "by-product gypsum", is typically produced as a by-product in various chemical processes. As stated above, flue gas desulfurization (FGD) gypsum is a by-product of stack gas scrubbing processes. Other types of synthetic gypsum may also be created by various other processes. For example, titanogypsum is produced by neutralizing waste sulfuric acid from the sulfate process used to manufacture titanium oxide pigment; phosphogypsum is a by-product produced when phosphate ore is acidulated to extract phosphoric acid; fluorogypsum is a by-product of the fluorspar acidulation reaction used to produce hydrofluoric acid; citrogypsum is a by-product of a process for producing citric acid; and borogypsum is a by-product of a process for producing boric acid.

Synthetic gypsum typically includes more free water (water not bound to calcium sulfate) than natural gypsum. Natural gypsum typically includes about 1%-3% free water (unless otherwise indicated, percentages herein indicate percent by weight), compared to synthetic gypsum which is typically mechanically de-watered to a slurry containing about 10%-15% free water.

What is needed is a system that can make use of use natural gypsum that is mined. As more power plants are coming on-line, there will be a greater supply of synthetic gypsum. The system will begin to be used in a mixture with natural gypsum. And possibly, there may be a time when only synthetic gypsum is used. Therefore, there is a need for a system that can produce calcined gypsum of a consistently high quality, regardless of the relative mixture of natural to synthetic gypsum, and regardless of the water content of the gypsum being used.

It is also important that the system makes efficient use of energy, including recycling of waste heat. This allows for a competitively priced product.

Figure 1:
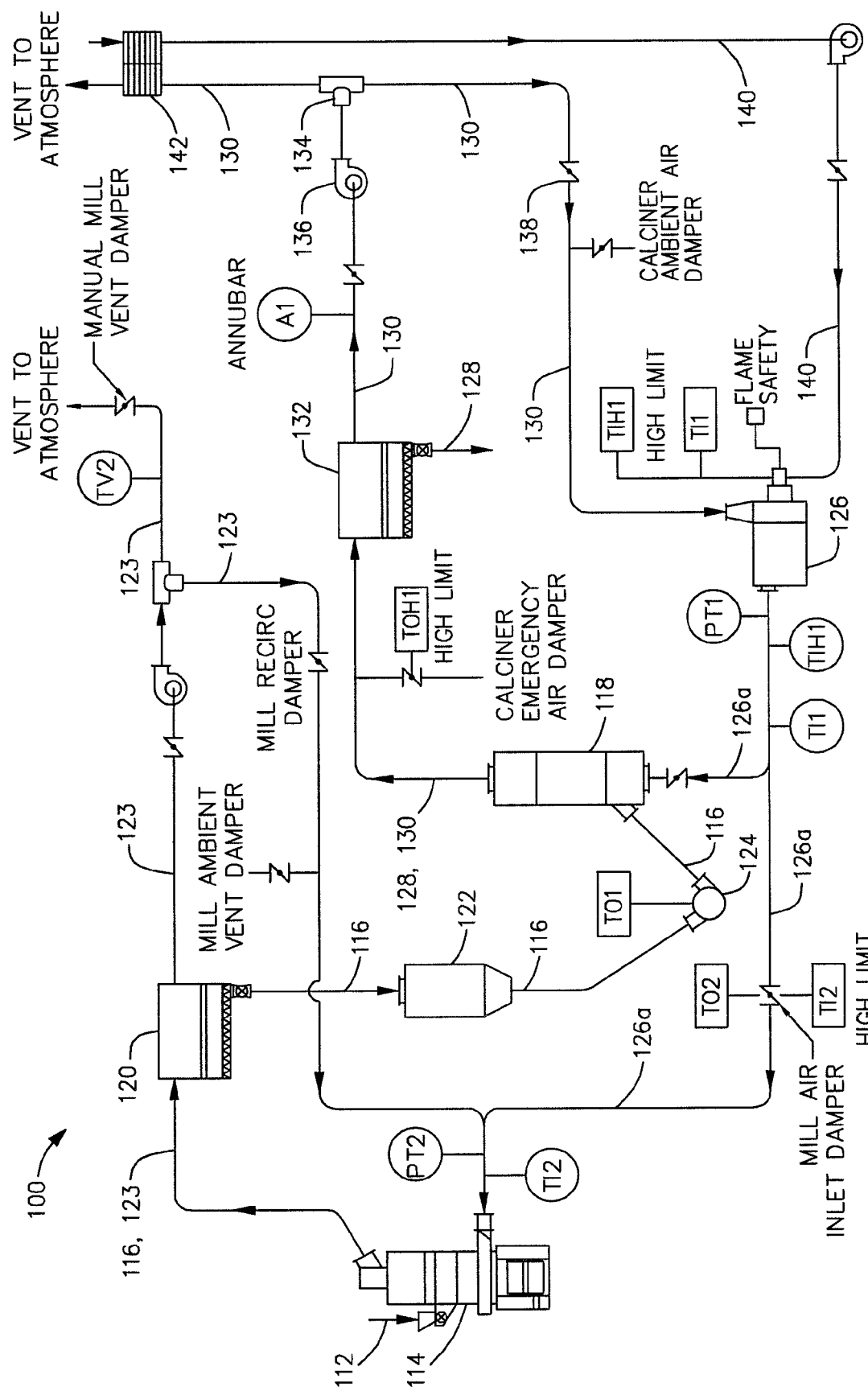
FIG. 1 is a diagram depicting an example of one embodiment of a system for calcining gypsum.

FIG. 1 illustrates a system for calcining gypsum, shown generally at 100. In one example of the system 100, gypsum 112 is supplied to a mill 114. The gypsum 112 can be natural gypsum, synthetic gypsum, or a combination thereof.

As illustrated in FIG. 1, the gypsum 112 is supplied to the mill 114 by any process transport means including, for example, pipes, conveyors, ducts, other conduits, and the like. The gypsum 112 is ground and dried in the mill 114 to produced dried gypsum 116. In one embodiment, the dried gypsum 116 is present in an exhaust gas 123 for transport to other sections of system 100.

In one embodiment, the gypsum 112 is supplied to the mill 114 at a constant rate or, alternatively, is supplied to the mill 114 on an "as-needed" basis. In one embodiment, the supply of the gypsum 112 to the mill 114 may be controlled by a control valve, a transducer providing, for example, temperature, pressure or electrical control, microprocessor based logic, or the like.

It should be appreciated that the mill 114 may be any apparatus that grinds and dries the gypsum 112. Some examples of suitable mills include, but are not limited to, for example, pendulum type roller mills, bowl mill pulverizers, and impact mills, including, for example an impact hammer mill, such as a Raymond® Imp Mill available from Alstom Power Inc., Air Preheater Company (Wellsville, N.Y., USA). FIGS. 1 and 3 illustrate a roller mill 114, 314, while FIG. 2 illustrates an impact hammer mill 214, and more specifically, an imp mill such as, for example, the aforementioned Raymond® Imp Mill.

Figure 2:
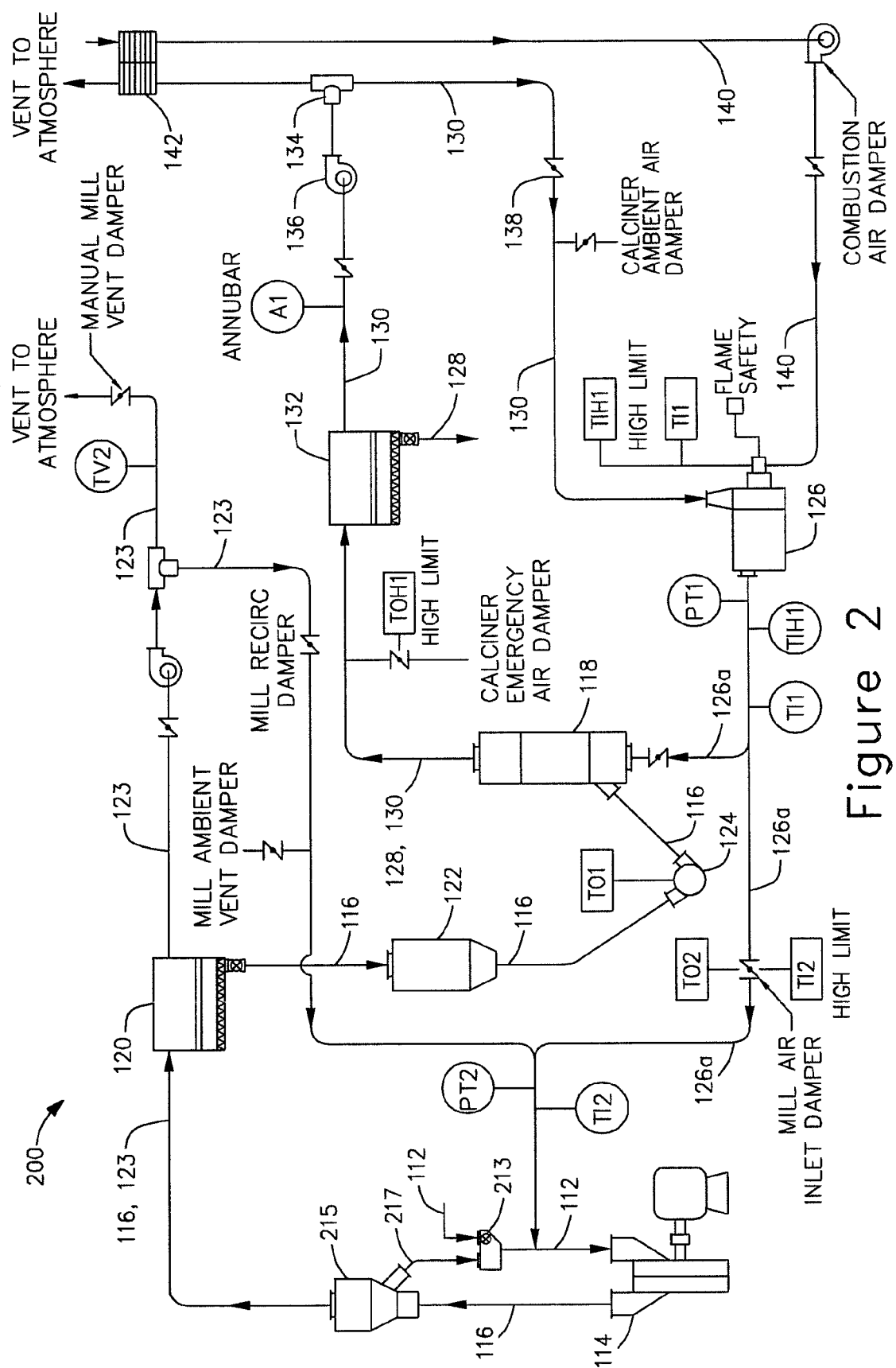
FIG. 2 is a diagram depicting an example of another embodiment of a system for calcining gypsum.
Figure 3:
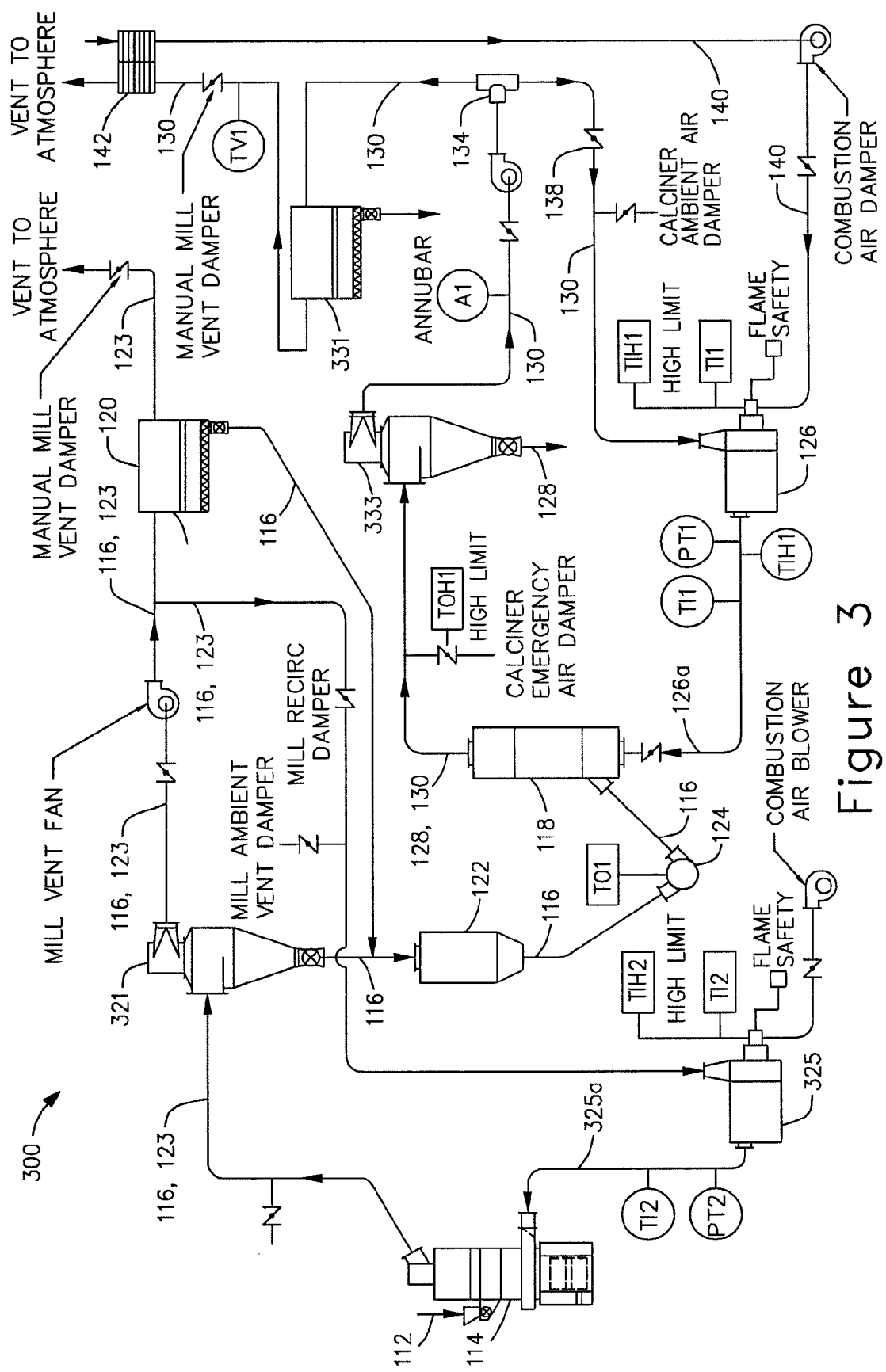
FIG. 3 is a diagram depicting an example of another embodiment of a system for calcining gypsum.

Referring to FIG. 2, wherein like numbers equal like parts as referred to in FIG. 1, gypsum 112 is supplied to the imp mill 114 via a feeder 213. The feeder 213 provides a constant supply of the gypsum 112 to the imp mill 114.

In one example, the imp mill 114 is coupled to a particle classifier 215, which separates dried gypsum 116 based on the size of particles present therein. For example, particles over a predetermined size (e.g., oversized particles) 217 are provided back to the feeder 213 to be supplied to the imp mill 114 for further processing (e.g., grinding and drying).

Referring back to FIG. 1, in one embodiment, the dried gypsum 116 and exhaust gas 123 are supplied to a flash calciner 118. In one example, as shown in FIG. 1, the dried gypsum 116 passes through a dust collector 120, a feed bin 122 and a dispersing feeder 124, before it is supplied to the flash calciner 118. The dust collector 120 facilitates the removal of the dried gypsum 116 from the exhaust gas 123 while the feed bin 122 stores the dried gypsum 116 until it is dispensed to the flash calciner 118 via the dispersing feeder 124. A portion of the exhaust gas 123 is vented to the atmosphere, while another portion of the exhaust gas 123 is recirculated to mill 114.

The dried gypsum 116 may be transported and supplied to the dust collector 120, the feed bin 122, the dispersing feeder 124 and the flash calciner 118 via, for example, pipes, conveyors, ducts, other conduits, and the like. As noted above, in one example, the dried gypsum 116 is transported with the exhaust gas 123. It is noted that in one example, the dust collector 120 may be replaced with a cyclone and a relatively smaller size dust collector (not shown in FIG. 1).

Calcining, e.g., the conversion of calcium sulfate dehydrate to calcium sulfate hemihydrate, of the dried gypsum 116 occurs in the flash calciner 118. In one embodiment, to facilitate calcining, the flash calciner 118 receives a stream of hot gas 126a from an air heater 126. In one embodiment, the stream of hot gas 126a has a temperature in a range of, for example, between about one thousand degrees Fahrenheit (1000° F.) and fourteen hundred degrees Fahrenheit (1400° F.). Calcining of the dried gypsum 116 facilitates the removal of bound moisture present in the dried gypsum 116.

In one embodiment, calcining of the dried gypsum 116 produces calcined gypsum 128 as well as an exhaust gas 130, which travel together to a calciner dust collector 132. In one embodiment, the exhaust gas 130 has a temperature in a range of, for example, between about three hundred degrees Fahrenheit (300° F.) and three hundred fifty degrees Fahrenheit (350° F.).

The calciner dust collector 132 removes dust particles and calcined gypsum 128 from the exhaust gas 130 and releases the exhaust gas 130 (as described below) to an environment such as, for example, the atmosphere. In one embodiment, the calciner dust collector 132 releases calcined gypsum 128 (e.g., stucco) to another section of system 100. In one example, the calciner dust collector 132 may be replaced with a cyclone and a relatively smaller size dust collector (not shown in FIG. 1). The calcined gypsum 128 proceeds to other sections of system 100 (not shown) or may be stored for transport and/or future use.

As shown in FIG. 1, in one embodiment, after passing through the calciner dust collector 132, at least a portion of exhaust gas 130 is transported to the air heater 126, while another portion of the exhaust gas is vented to the atmosphere. In one example, as shown in FIG. 1, the exhaust gas 130 is transported to the air heater 126 by a mechanism 134. In one embodiment, the mechanism 134 may be any apparatus that facilitates the diversion and transportation of at least a portion of the exhaust gas 130 to the air heater 126. Examples of the mechanism 134 include, but are not limited to, for example, a teed duct, and the like. In one embodiment, the mechanism 134 may be controlled by microprocessor based logic or another type of controller (not shown).

In one embodiment, prior to being transported to the air heater 126, the exhaust gas 130 travels through a calciner vent fan 136 and a recirculating damper 138. However, it is contemplated that the exhaust gas 130 may be supplied directly to the air heater 126 without passing through the calciner vent fan 136 and the recirculating damper 138. In one embodiment, the recirculating damper 138 may be controlled by microprocessor based logic or another type of controller (not shown). It is also contemplated that the exhaust gas 130 may pass through other devices prior to reaching the air heater 126.

The air heater 126 utilizes the exhaust gas 130 to produce the stream of hot gas 126a. In one embodiment, the hot gas 126a is supplied to the flash calciner 118. In another embodiment, and as shown in FIG. 1, the hot gas 126a is supplied to both the flash calciner 118 and the mill 114. The hot gas 126a is supplied to either the flash calciner 118, the mill 114, or both, through any mechanism able to facilitate the transfer of the hot gas. The hot gas 126a may be supplied by, for example, pipes, ducts, conduits, pumps, valves, and the like.

It should be appreciated that utilization of the exhaust gas 130 to produce the stream of hot gas 126a reduces the amount of energy needed to produce the stream of hot gas for the flash calciner 118 since the exhaust gas 130 usually has a temperature in a range of, for example, between about three hundred degrees Fahrenheit (300° F.) and three hundred fifty degrees Fahrenheit (350° F.).

In one example, as shown in FIG. 1, in the air heater 126, the exhaust gas 130 is combined with an air stream 140, which is provided by the atmosphere. As shown in FIG. 1, the air stream 140 may be heated in an air preheater 142 prior to entering the air heater 126. However, it is contemplated that the air stream 140 is not heated prior to entering the air heater 126. While not shown, it is contemplated that in another example the air heater 126 utilizes only the exhaust gas 130 to generate the stream of hot gas 126a.

In another embodiment, as shown in FIG. 3, wherein like numbers equal like parts as referred to in FIG. 1, gypsum 112 is supplied to mill 114. As discussed above, mill 114 may be any apparatus that grinds and dries the gypsum 112 to produce dried gypsum 116. In one embodiment, dried gypsum 116 is produced with an exhaust gas 123.

Dried gypsum 116 and exhaust gas 123 are sent to a mill cyclone 321, which collects and separates the dried gypsum 116 from the exhaust gas 123. The separated dried gypsum 116 proceeds to feed bin 122, while a portion of exhaust gas 123 having some dried gypsum 116 therein, proceeds to dust collector 120. Dust collector 120 further separates any remaining dried gypsum 116 from the exhaust gas 123. The dried gypsum 116 separated in the dust collector 120 is sent to the feed bin 122. It is contemplated that system 300 may not include mill cyclone 321, and accordingly, dried gypsum 116 would proceed straight to dust collector 120.

Another portion of exhaust gas 123 and dried gypsum 116 proceed from mill cyclone 321 to air heater 325. Air heater 325 utilizes exhaust gas 123 to produce a stream of hot gas 325a that is supplied to the mill 114. Hot gas 325a may be supplied to the mill 114 by any mechanism able to facilitate the transfer of hot gas 325a to the mill. Examples include, but are not limited to conduits, pumps, valves, ducts, pipes, and the like.

Feed bin 122 stores the dried gypsum 116 until it is dispensed to the flash calciner 118 via the dispersing feeder 124. Calcining of the dried gypsum 116 produces calcined gypsum 128 as well as an exhaust gas 130, which travel together to a calciner cyclone 333. Calciner cyclone 333 removes calcined gypsum 128 and releases it to another section of system 300.

As shown in FIG. 3, after proceeding through calciner cyclone 333, at least a portion of exhaust gas 130 is transported to air heater 126, while another portion of the exhaust gas is brought to dust collector 331. The dust collector 331 removes any remaining particulates present in the exhaust gas 130 prior to its release to the atmosphere.

As shown in FIG. 3, prior to being transported to air heater 326, the exhaust gas 130 travels through a calciner vent fan 136 and a recirculating damper 138.

Air heater 126 utilizes the exhaust gas 130 to produce the stream of hot gas 126a, which is provided to the flash calciner 118. In one example, as shown in FIG. 3, in the air heater 126, the exhaust gas 130 is combined with an air stream 140, which is provided by the atmosphere. As shown in FIG. 3, the air stream 140 may be heated in an air preheater 142 prior to entering air heater 126. However, it is contemplated that air stream 140 is not heated prior to entering the air heater 126.

In use, systems 100, 200 and 300 process the gypsum 112 by supplying the gypsum to the mill 114. It should be appreciated that the gypsum 112 supplied to the mill 114 is natural, synthetic or a combination thereof. In one embodiment, the gypsum 112 is supplied to the mill 114 by any mechanism capable of transporting the gypsum to the mills, including, but not limited to, for example, pipes, ducts, valves, conduits, conveyors, and the like.

The gypsum 112 is ground and dried in the mill 114 to form the dried gypsum 116 and exhaust gas 123. It should be appreciated that grinding of gypsum in a mill may be performed by, for example, crushing or grinding mechanisms, such as hammers, while drying gypsum in the mill 114 may be performed by contacting the gypsum with a stream of air or hot gas.

In one embodiment, exhaust gas 123 is transported to the air heater 325, which produces hot gas 325a that is transported to mill 114. The dried gypsum 116 is then supplied to the flash calciner 118 where it is calcined. Calcining of the dried gypsum 116 produces the calcined gypsum 128 as well as the exhaust gas 130. At least a portion of the exhaust gas 130 is transported to the air heater 126 via ducts, pipes, conduits, and the like.

The exhaust gas 130 is utilized in the air heater 126 to produce hot gas streams 126a. In one example, the hot gas stream 126a is supplied to the flash calciners 118. In another example, the hot gas stream 126a is supplied to the mill 114. In another example, at least a portion of the hot gas stream 126a is supplied to the flash calciner 118 and another portion of the hot gas stream 126a is supplied to the mill 114. The hot gas stream 126a may be supplied to the flash calciner 118 and/or the mill 114 via any mechanism adapted to do so, including, but not limited to, for example, pipes, ducts, conduits, and the like. Fans and dampers may be utilized in supplying the flash calciner 118 and/or the mill 114 with the hot gas stream 126a.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for calcining natural gypsum, synthetic gypsum or a combination thereof, the system comprising:
   a mill for grinding and drying natural gypsum, synthetic gypsum or a combination thereof, to produce dried gypsum;
   a flash calciner for calcining the dried gypsum to produce an exhaust gas and calcined gypsum; and
   a mechanism for transporting at least a portion of the exhaust gas produced by the flash calciner to a first air heater that supplies hot gas to the flash calciner and to the mill.

2. A system according to claim 1, wherein the mill is a roller mill.

3. A system according to claim 1, wherein the mill is a hammer impact mill.

4. A system according to claim 1, wherein the first air heater only provides hot gas to the calciner and further comprising a second air heater that provides hot gas to the mill.

5. A system according to claim 1, further comprising a dust collector coupled to the mill.

6. A process for calcining natural gypsum, synthetic gypsum or a combination thereof, the process comprising:
- supplying natural gypsum, synthetic gypsum or a combination thereof to a mill;
- grinding and drying the natural gypsum, synthetic gypsum or a combination thereof in the mill to form dried gypsum and a first exhaust gas;
- supplying the dried gypsum to a flash calciner;
- calcining the dried gypsum in the flash calciner, thereby producing a second exhaust gas and calcined gypsum; and
- transporting at least a portion of the second exhaust gas to a first air heater that provides hot gas to the flash calciner and to the mill.

7. A process according to claim 6, wherein the mill is a roller mill.

8. A process according to claim 6, wherein the mill is a hammer impact mill.

9. A process according to claim 6 further comprising transporting at least a portion of the first exhaust gas to a second air heater.

10. A process according to claim 9, wherein the first air heater only provides hot gas to the calciner and the second air heater is coupled to the mill, and provides hot gas thereto.

11. A system for calcining gypsum, the system comprising:
- a mill for grinding and drying gypsum, thereby producing dried gypsum and a first exhaust gas, wherein the mill is selected from a roller mill or a hammer impact mill, and further wherein the gypsum is selected from natural gypsum, synthetic gypsum or a combination thereof;
- a flash calciner for calcining the dried gypsum, thereby producing calcined gypsum and a second exhaust gas; and
- a mechanism for transporting the second exhaust gas produced by the flash calciner to a first air heater coupled to the flash calciner and to the mill.

12. A system according to claim 11, further comprising a dust collector coupled to the mill.

13. A system according to claim 11, further comprising a second air heater.

14. A system according to claim 13, wherein the first air heater is only coupled to the flash calciner and the second air heater is coupled to the mill.

15. A system according to claim 13, further comprising a mechanism for transporting the first exhaust gas to the second air heater.

* * * * *